Sept. 28, 1954 H. THOMAS ET AL 2,690,264
OIL FILTER
Filed Aug. 1, 1951 2 Sheets-Sheet 1
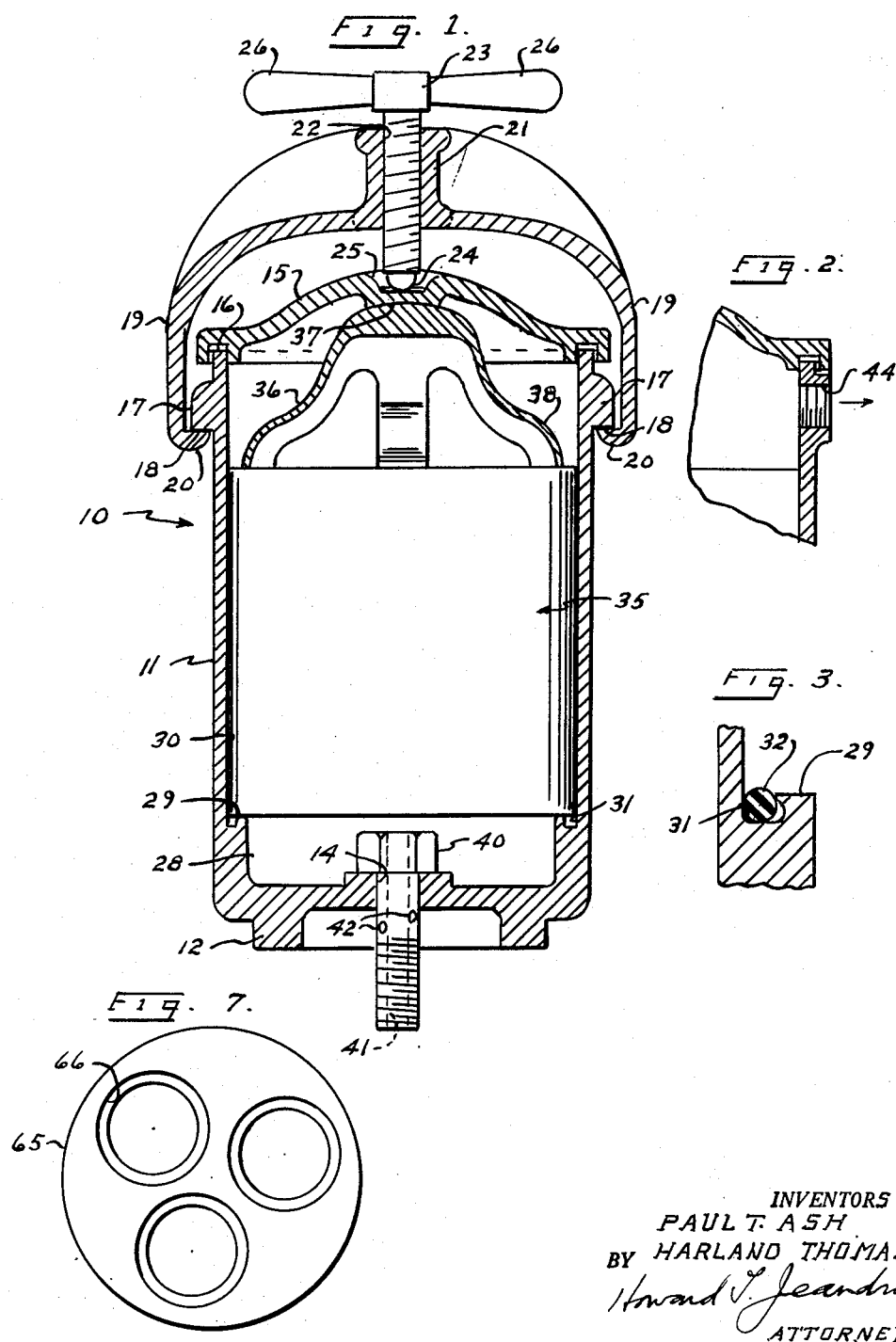
INVENTORS
PAUL T. ASH
BY HARLAND THOMAS
Howard J. Jeandron
ATTORNEY

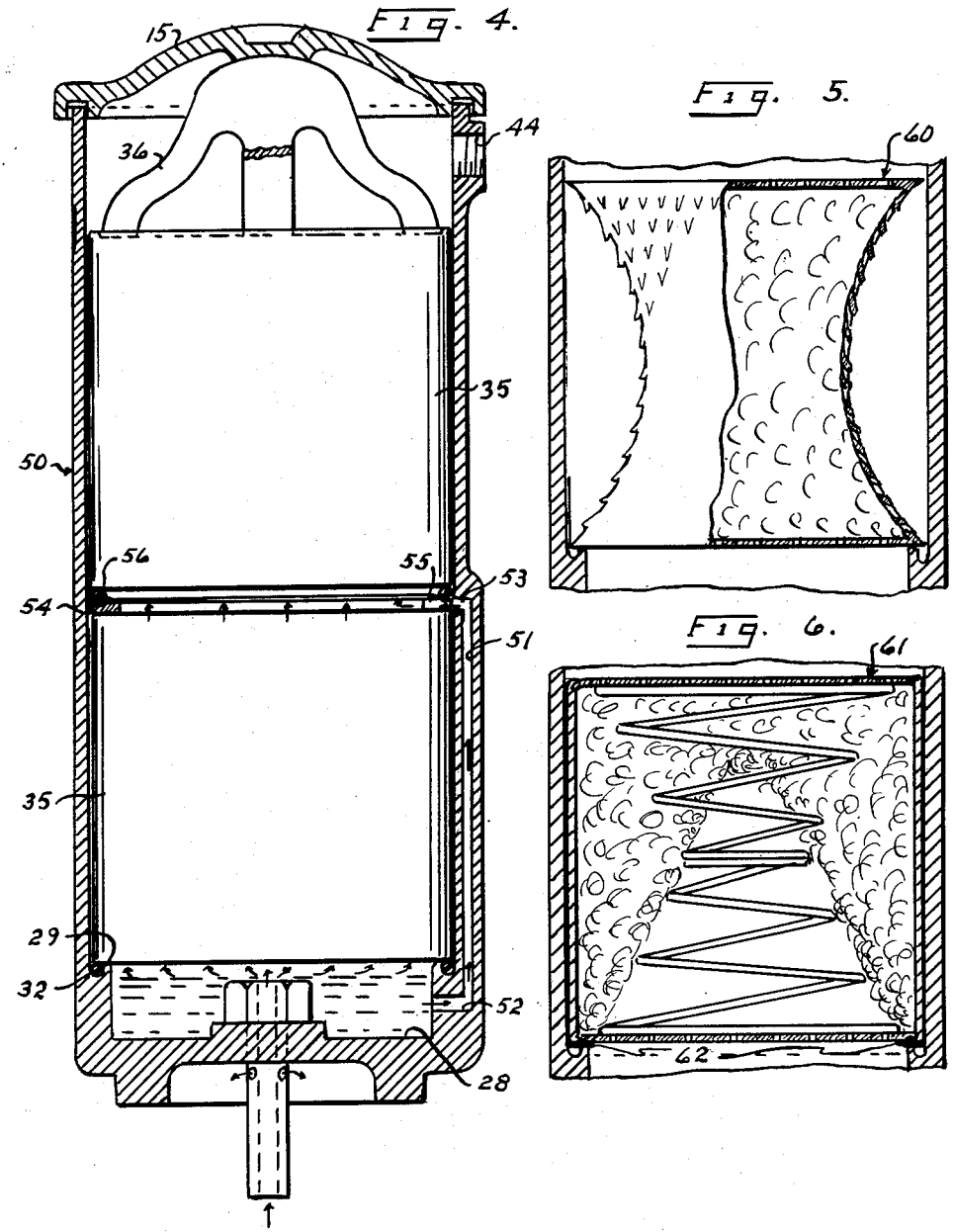

Patented Sept. 28, 1954

2,690,264

UNITED STATES PATENT OFFICE 2,690,264

OIL FILTER

Harland Thomas, Port Ewen, N. Y., and Paul T. Ash, Keyport, N. J., assignors to General Clarifier Corporation of America Application August 1, 1951, Serial No. 239,654

1 Claim. (Cl. 210—134)

This invention relates to a liquid filter and particularly to a type of liquid filter containing a replaceable cartridge and more particularly a cartridge in the form of a can.

It is an object of this invention to provide a liquid filter in which the cartridge is quickly and easily replaced.

A further object of this invention is to provide a liquid filter that may contain a plurality of cartridge elements and in which one or more may be quickly and easily changed.

It is a further object of this invention to provide a liquid filter in which the cartridge is comprised of a can element and in which the can is pressed into a tight sealing relation with the inlet end of the filter to insure the passage of the oil through said can cartridge element.

It is a further object of this invention to provide a liquid filter in which the filtering cartridge is retained in a sealed relationship at the inlet end of said filter by means of a resilient element and in which the seal of the cartridge element may be broken to by-pass the liquid in the event there is an excessive fluid pressure from the inlet end of said filter.

It is a further object of this invention to provide a cartridge element for a liquid filter in the form of a tin can in which a pair of helical springs are mounted in opposed relationship and in which the filtering material is packed around the periphery of one of said springs.

A still further object of this invention is to provide a cartridge element for an oil filter in the form of a tin can in which the tin can is formed in the shape of an hour glass and in which the walls of said tin can are perforated to permit the egress of the filtered oil passing through said cartridge.

Other objects of this invention may become apparent by reference to the accompanying detailed description and the drawings in which:

Fig. 1 illustrates a cross sectional view of the oil filter,

Fig. 2 is a partial cross sectional view of the outlet port of said oil filter,

Fig. 3 is a partial cross sectional view illustrating the mounting of a toroidal sealing washer, Fig. 4 illustrates in cross section another embodiment of the oil filter, Fig. 5 is a partial cross sectional view of an oil filter illustrating another embodiment of this invention, Fig. 6 is a partial cross sectional view of an oil filter illustrating a still further embodiment of this invention, and Fig. 7 is a further embodiment of this invention illustrating a casing with a plurality of bores.

Referring to Fig. 1 there is illustrated a liquid filter 10, which in this embodiment is an oil filter. The filter is comprised of a casing 11 generally cup shaped in form adapted to receive a cartridge element. The casing 11 is provided with a mounting base 12 and a central aperture 14 through said base. A cover or cap 15 is provided for the casing 11. A seal or washer 16 is provided to be mounted between the cover 15 and the rim of the casing 11. The cover 15 is provided with a generally U shaped groove around its periphery to mate with and fit the rim of the casing 10 and the washer 16 is mounted within the U shaped groove. The casing 11 is also provided with a pair of integral lugs 17 provided with a downwardly facing shoulder 18. A pair of tong like elements 19 are provided with hook shaped ends 20 to abut with the shoulders 18. The elements 19 are joined rigidly to a central element 21 that is provided with an internal thread 22. Mounted through the internal thread 22 is a threaded element 23, element 23 is provided with a rounded end 24 that is mounted on the top of the cover 15 in a pocket 25 of the cup 15. The opposite end of element 23 is provided with a pair of finger gripping handles 26. Referring to the base 12 of the casing 11, it is to be noted that the base is provided with a sludge chamber 28 and the shoulder 29 between the sludge chamber 28 and the internal periphery 30 of the casing 11. The shoulder 29 is provided with a groove 31. Thus, the bearing edge of the shoulder 29 may be rounded as illustrated in Fig. 1 or the shoulder may have a flat surface as illustrated in Fig. 3. Likewise, the groove 31 as illustrated in Fig. 3 may be shaped to receive a toroidal sealing washer 32. Mounted within the casing 11 is a tin can cartridge filter 35. It is to be noted that the can cartridge fits snugly within the internal periphery 30 of the casing 11 and the lower end of the can 35 seats upon the shoulder 29, while the upper end of the tin can cartridge 35 is retained by a resilient element 36. Element 36 is fitted with its upper contour to mate with a bearing plate 37 on the lower surface of the cover 15. Element 36 is provided with a plurality of bearing fingers 38 and as illustrated in Fig. 1, element 36 is in a compressed relationship retaining the can 35 in a tight bearing relationship with the shoulder 29 of the base 12. However, element 36 is provided with sufficient resiliency so that in the event of excessive pressure from the lower face of the cartridge, the excessive pressure will lift the cartridge 35 and permit by-passing the fluid under pressure around the periphery of the can 35. In the base 12 of the casing 11 in aperture 14 there is inserted a mounting bolt 40. Bolt 40 is provided to mount the casing 11 and particularly the base 12 in a tight fitting relationship to the motor of the motor vehicle. The bolt 40 is provided with a bore 41 through its center to permit the passage of oil from the motor pump through the bolt into the sludge chamber 28 of the casing. There are a plurality of apertures 42 provided around the periphery of the bolt 40 below the sludge chamber so that a large percentage of the oil that is pumped through bolt 40 will pass through the apertures 42 and thus circulate back to the oil system of the motor vehicle. Thus only a predetermined percentage of the oil from the motor vehicle oil pump will be pumped through the oil filter. The oil that is pumped through the oil filter, that is, through the cartridge 35 which is necessarily perforated on both its bottom and top faces will pass into the upper chamber of the casing 11 above the can cartridge and referring to Fig. 2 will pass through the outlet port 44 to the motor as thoroughly filtered oil.

Although we have illustrated and described one embodiment in which the oil passes upward, the same device may be inverted to thus feed the oil to the top and have the oil pass downward for a filtering operation. Likewise, although we have shown the casing 10 mounted with a central mounting bolt 40 that is affixed through the base 12, we may position bolt or bolts in other positions, to permit a different installation, such as to the dash or fire wall of a motor vehicle.

It is apparent that the oil filter may be easily disassembled starting with the device as illustrated in Fig. 1. The handle 26 is first turned to release member 21 and the arms 19 from engagement with members 17 of the casing. When the hooked ends 20 have been released, member 21 may be lifted bodily from the cover 15. The cover 15 may then be lifted from casing 11. Member 36 may then be lifted out of the casing then the can cartridge 35 may be lifted out of the casing 11. The cartridge 35 is easily provided with either a finger hole in its top cover or with a wire loop affixed to the top cover to permit grasping the cartridge for easy removal. This is all that is necessary to replace a new cartridge. However it is also possible to release bolt 40 and thus remove the casing 11 from its mounting plate on the motor. The assembly of the unit will naturally be in the reverse of the disassembly just described. The operation of the device is quite apparent by reference to Fig. 1. With the casing 11 mounted by means of its base 12 to a mounting plate (not shown) by means of the bolt 40, the oil from coil pump of the motor is pumped through the bore 41 of the bolt 40. Thus a certain percentage of the oil will be pumped into the sludge chamber 28 of the casing and as the oil is continuously pumped it will be forced upward through the cartridge 35 being filtered. The oil thus passes into the upper chamber of casing 11 above the cartridge 35 and in turn out the outlet port 44. It is to be noted that the oil must pass through the cartridge 35 due to the sealing of the bottom edge of the cartridge 35, that is, the shoulder 29 is tightly pressed into a sealing engagement with the lower face of the cartridge 35 and in another embodiment using a sealing washer 32 the lower face of the can will bear upon the washer 32 to provide an effective seal. It is also apparent that with a resilient retaining means such as 36, the cartridge 35 may be forced upward by an excessive pressure on the lower face of the cartridge. In such instance the cartridge reacts like a safety valve permitting the excessive fluid pressure to escape past the shoulder 29 or seal 32 and thus pass around the can periphery until the excessive pressure has been relieved. This excessive pressure is so often developed under extremely cold starting conditions but as soon as the motor heats the oil is reduced in its consistency and the pressure drops considerably until a normal oil pressure results at which time the resilient member 36 will naturally force the can cartridge 35 back onto the sealing shoulder 29.

Referring to Fig. 4 there is illustrated another embodiment of this invention in which the casing 50 is constructed similar to casing 11 of the prior embodiment except that it is considerably elongated to permit inserting a plurality of cartridges 35. In such instance, the oil being filtered must pass through more than one filtering cartridge before passing through the outlet port 44. In a further embodiment of this invention, the casing 50 is altered or rather the wall is increased in its diameter at the lower portion of the casing to permit drilling or forming one or more bores 51 through said wall. The bore 51 is in turn connected at its lower extremity by a bore 52 to the sludge chamber 28 of the casing while the bore 51 is connected at its upper extremity by a bore 53 with the cartridge containing chamber. However, bore 53 is positioned so that it will be slightly above the upper edge of the can 35 when mounted within casing 50. In order that this aperture may remain open to the cartridge chamber, a disk or spacer 54 is inserted to rest upon the top of the can 35 and a cutout portion 55 of the spacer 54 is positioned adjacent to the bore 53. Since we have provided a seal at the lower edge of the first can 35, it is necessary to provide another seal or washer 56 that will bear upon the spacer 54 and upon which the next cartridge or can 35 may rest. Thus when the member 36 is positioned on top of the upper cartridge and the cover 15 is placed in position and compressed in a tight fitting relation, the upper cartridge 35 will be forced downward upon the seal 56 to provide the same sealing action as provided by shoulder 29 and its accompanying seal 32. The embodiment illustrated in Fig. 4 thus provides the means to utilize a plurality of cartridges 35 and thus increase the filtering action of the oil passing through the filter.

Fig. 5 illustrates a further embodiment of this invention in which the can 35 is replaced by the filter unit 60. The filter unit 60 is similarly constructed as a metal enclosed can but in this instance the walls of the can are shaped in the form of an hour glass and in addition the walls are perforated over their entire surface. The perforations are preferably made in an upward direction so that the oil passing through said filter must be directed downward by these perforations to leave the filtering cartridge. Thus the oil passing upward through cartridge 60 will be deflected from its upward normal path. This configuration produces a much greater area from which the oil may escape than in the prior embodiment where only the upper surface of the can is perforated. This embodiment produces a greater flow or a flow of less resistance although the filtering material is producing the same effect upon the fluid passing therethrough.

A still further embodiment of this invention is illustrated in Fig. 6 in which the cartridge 61 is similarly formed as a tin can and in which there are inserted two springs formed as a helix and positioned in abutting relationship so that their force reacts in opposition to each other. In this embodiment the filtering material is packed about the lower spring leaving the internal periphery of the helix unpacked whereas the filtering material is packed around and within the upper spring. Thus this cartridge will be similar to the cartridge already claimed in a prior related application except that the introduction of the additional spring prevents the compression of the filtering material by the spring and the spring thus becomes simply a form of retaining means to hold the filtering material in the predetermined formation illustrated.

Referring to Fig. 7 there is illustrated another embodiment of this invention in which a casing 65 is provided with three or more bores 66. The bores 66 are of the same internal diameter as the bore of casing 11 to thus permit the insertion of the cartridges 35 in each bore 66. The construction of the casing 65 may be similar to the casing 11, that is, the base portion will be duplicated for each bore 66 and the cover 15 may be duplicated for each bore 66 thus permitting the use of a plurality of cartridges for filtering purposes and also permitting the changing of any one or all filter cartridges when desired.

Various changes and modifications may be made in the oil filter casing to produce the same results, that is, the casing may be elongated to permit more than two cartridges being used without departing from the spirit of this invention and this invention shall be limited only by the appended claim.

A still further embodiment of this invention includes another form of seal for the bottom edge of the cartridge 35. Normally, a sealing washer 32 is provided, but another form of sealing has been provided in Fig. 6 in which each can or cartridge 61 is dipped, that is the rim of the bottom edge is immersed in a solution that will adhere to the can. This solution forms a thin tacky or resilient layer 62 around the rim of the can, and thus provides the sealing means when the can or cartridge 61 is inserted within the casing. The sealing coating or skin adheres to the can and when pressed against the shoulder 29 will form a tight fluid seal. The solution used to provide this sealing skin may vary according to the fluid that is to be filtered, with a liquid such as water the solution may be a form of rubber such at latex. With the filtering of an oil or gasoline product the solution may be a polymerized plastic resin product that provides the same resilient properties as the rubber and adheres to the can, but is impervious to the chemical reaction produced by the oil or gasoline.

Various changes and modifications may be made in the liquid filter casing to produce the same results, that is, the casing may be elongated to permit more than two cartridges being used or the casing may be formed in a different shape to permit the use of a plurality of cartridges in parallel relationship without departing from the spirit of this invention or the cartridges may be formed in different shapes as illustrated in Fig. 5 or may be modified in various ways as illustrated in Fig. 6 without departing from the spirit of this invention and this invention shall be limited only by the appended claim.

What is claimed is:

An oil filter comprising a housing member having inlet and outlet openings at opposite ends thereof, said housing member provided with an internal bore to retain a plurality of cartridges, a plurality of cartridges mounted in aligned relationship within said housing member between said openings, each cartridge comprised of a cylindrical can with both ends perforated and filtering material within said can, said housing member provided with a sludge chamber of a smaller diameter than the internal bore of said housing member, a supporting shoulder provided between said sludge chamber and said internal bore of said housing member, a spacing washer inserted between said cartridges to retain them in a spaced relationship to provide an auxiliary chamber between cartridges, a cap member for said housing member, a resilient means positioned between said cap member and the upper end of the top cartridge to retain said cartridges in a tight fitting relationship and the lower end of the bottom cartridge in a tight fitting relationship with said shoulder to cut off communication between the inlet and outlet openings of the housing, an auxiliary oil passage connecting the sludge chamber with the auxiliary chamber formed by the spacing mounted between said cartridges to permit by-passing oil from the inlet of said housing to the chamber between cartridges.

References Cited in the file of this patent

UNITED STATES PATENTS

| Number | Name | Date |
|---|---|---|
| 1,173,725 | Ludwig et al. | Feb. 29, 1916 |
| 1,917,121 | Hughson | July 4, 1933 |
| 2,081,968 | Wicks et al. | June 1, 1937 |
| 2,106,218 | Krieck | Jan. 25, 1938 |
| 2,197,252 | Decker | Apr. 16, 1940 |
| 2,221,465 | Aldham | Nov. 12, 1940 |
| 2,253,685 | Burkhalter | Aug. 26, 1941 |
| 2,298,674 | Burhans | Oct. 13, 1942 |
| 2,331,961 | Clark | Oct. 19, 1943 |
| 2,543,481 | Wicks et al. | Feb. 27, 1951 |
| 2,554,748 | Lewis et al. | May 29, 1951 |